United States Patent
Löhken et al.

(10) Patent No.: US 10,453,332 B2
(45) Date of Patent: Oct. 22, 2019

(54) ELECTROMECHANICAL CONTROL ASSEMBLY FOR A CHAIR

(71) Applicant: Stabilus GmbH, Koblenz (DE)

(72) Inventors: Lars Löhken, Bonn (DE); Ulrich Probst, Hillscheid (DE); Raphael Piroth, Koblenz (DE); Markus Müller, Koblenz (DE)

(73) Assignee: Stabilus GmbH, Koblenz (DE)

( * ) Notice: Subject to any disclaimer, the term of this patent is extended or adjusted under 35 U.S.C. 154(b) by 217 days.

(21) Appl. No.: 15/138,402

(22) Filed: Apr. 26, 2016

(65) Prior Publication Data
US 2016/0327933 A1 Nov. 10, 2016

(30) Foreign Application Priority Data
May 4, 2015 (DE) .................. 10 2015 208 215

(51) Int. Cl.
| | |
|---|---|
| *G05B 21/00* | (2006.01) |
| *G01M 1/38* | (2006.01) |
| *G05B 13/00* | (2006.01) |
| *G05B 15/00* | (2006.01) |
| *G05D 23/00* | (2006.01) |
| *G08C 17/02* | (2006.01) |

(52) U.S. Cl.
CPC ......... *G08C 17/02* (2013.01); *G08C 2201/31* (2013.01); *G08C 2201/50* (2013.01); *G08C 2201/93* (2013.01); *Y02P 90/265* (2015.11)

(58) Field of Classification Search
CPC ........................... G08C 17/02; G08C 2201/31; G08C 2201/50; G08C 2201/93
USPC ....................................................... 700/275
See application file for complete search history.

(56) References Cited

U.S. PATENT DOCUMENTS

| 9,177,465 B2 | 11/2015 | Vanderpohl, III |
| 9,228,885 B2 | 1/2016 | Zerhusen et al. |
| 2002/0032048 A1* | 3/2002 | Kitao .................. H04M 1/6091 455/569.2 |
| 2005/0264020 A1* | 12/2005 | Egan ........................ B60N 2/14 296/63 |
| 2011/0205061 A1 | 8/2011 | Wilson et al. |

(Continued)

FOREIGN PATENT DOCUMENTS

DE 102012105227 12/2013

OTHER PUBLICATIONS

German Search Report of DE 10 2015 208 215.6 dated Mar. 1, 2016, 9 pages.

*Primary Examiner* — Md Azad
(74) *Attorney, Agent, or Firm* — Rankin, Hill & Clark LLP

(57) ABSTRACT

The invention relates to a system comprising a seat (10) and a mobile terminal that are or can be connected to one another in order to transmit data, wherein the seat (10) comprises at least one electromechanical actuator (22, 24, 26, 28) and/or at least one sensor element (32, 34, 36, 38), the mobile terminal is designed to receive inputs from a user and control the at least one actuator (22, 24, 26, 28) on the basis of these inputs and/or to receive and process data collected by the at least one sensor element (32, 34, 36, 38), and the seat (10) and the mobile terminal are each provided with at least one communication means (44), which are designed to wirelessly transmit data between the seat (10) and the mobile terminal. The invention also relates to a corresponding method.

11 Claims, 1 Drawing Sheet

(56) References Cited

U.S. PATENT DOCUMENTS

| | | | |
|---|---|---|---|
| 2012/0086249 A1* | 4/2012 | Hotary | B60N 2/809 |
| | | | 297/284.3 |
| 2014/0115784 A1 | 5/2014 | Johannigman et al. | |
| 2014/0124274 A1* | 5/2014 | Zerhusen | A61G 7/001 |
| | | | 177/144 |
| 2014/0250597 A1 | 9/2014 | Chen et al. | |
| 2015/0075575 A1* | 3/2015 | Karlovich | A63B 69/0064 |
| | | | 135/66 |
| 2015/0238023 A1* | 8/2015 | Rawls-Meehan | A47C 20/041 |
| | | | 700/275 |
| 2016/0031560 A1* | 2/2016 | Zheng | B64D 11/064 |
| | | | 297/344.1 |
| 2016/0183687 A1* | 6/2016 | Hoyt | A47C 31/126 |
| | | | 297/217.2 |
| 2016/0304207 A1* | 10/2016 | Carles | B64D 11/0015 |

\* cited by examiner

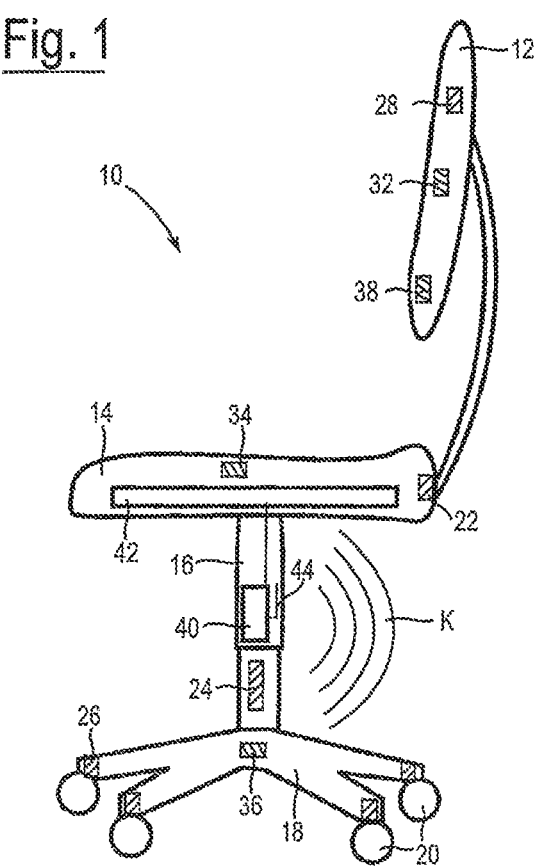
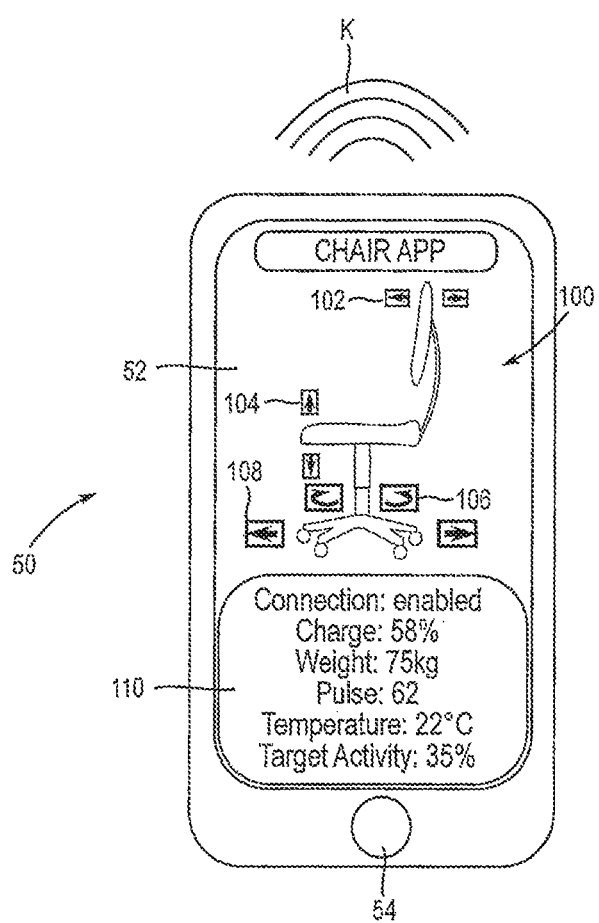

ELECTROMECHANICAL CONTROL ASSEMBLY FOR A CHAIR

BACKGROUND

The present invention relates to a system comprising a seat and a mobile terminal that are or can be connected to one another in order to transmit data. The invention also relates to a method for controlling at least one electromechanical actuator assigned to a seat and/or for receiving, processing and displaying, by means of a mobile terminal, data collected by a sensor element that is assigned to the seat.

Recently, it has become apparent that people, in particular those working in the service sector, spend a considerable amount of their time sitting down, while it is also evident that a high proportion of the population own mobile terminals that are capable of processing data, in particular smartphones or tablet computers. Two further much-discussed trends in this context are the "Internet of Things" and the "Quantified Self".

The expression "Internet of Things" describes how the personal computer in the form of a monolithic workstation is increasingly losing importance, and is instead being replaced by "intelligent objects". For this purpose, processors, sensor components and actuators are being embedded into everyday objects in order to assist people without distracting them or without the people even noticing at all. One extremely dynamic market in this field is that of "wearables" in which sensors and/or operating interfaces are incorporated into items of clothing or accessories, for example. The term "Quantified Self" is also a term used within this context which describes recording personal data, in particular by means of the aforementioned wearables, and analysing and evaluating the collected data. In so doing, the user is able to analyse their personal, health and sport-related habits, which, in an ideal situation, leads to a more conscious and healthier lifestyle.

BRIEF DESCRIPTION

The present inventor has recognised that a system comprising a seat and a mobile terminal can be an optimum platform for applications relating to both the "Internet of Things" and the "Quantified Self" since, as explained above, the two mentioned objects already play a central role in daily life and are therefore best suited for this purpose.

The invention therefore relates to a system comprising a seat and a mobile terminal that are or can be connected to one another in order to transmit data, the seat comprising at least one electromechanical actuator and/or at least one sensor element, the mobile terminal also being designed to receive inputs from a user and control the at least one actuator on the basis of these inputs, and/or to receive and process data collected by the sensor element. In this respect, the seat and the mobile terminal are each provided with at least one communication means, which are designed to wirelessly transmit data between the seat and the mobile terminal.

The system provided in such a manner can have a high degree of flexibility owing in particular to the data being transmitted wirelessly. The system can also be executed in a wide range of different seats, including types of chairs and armchairs that are already known, but not excluding seats specially designed for this purpose, which are for example primarily designed so as to provide an anatomically advantageous sitting position or so as to make it possible to perform exercises for supporting the user's back.

In particular, owing to the fact that modern mobile terminals are already equipped with exceptionally high-performance processors, the electronics to be provided in the seat can be kept relatively simple. This makes it possible to equip new seats with the necessary components or retrofit the necessary components to existing seats in a relatively cost-effective manner because, as explained above, normally the user already owns the mobile terminals.

The communications means assigned to each of the seat and the mobile terminal can also be selected according to the intended purpose; for example, if the seat only comprises sensor elements and does not comprise any actuators, it may be provided with only a transmitter, whereas a seat comprising both sensor elements and electromechanical actuators may be provided with a transceiver.

By virtue of a high degree of flexibility, the system according to the invention offers a wide range of possible designs and applications. A first example of a functionality to be provided is that of the at least one electromechanical actuator being able to control at least one position parameter of the seat. This may include controlling, by means of the mobile terminal, parameters such as the seat height and seat angle, the backrest position or the armrest position of the seat. As explained above, if this is the only functionality to be provided in the system, the electronics associated with the seat can be kept exceptionally simple because, ultimately, only the communication means, one or more electromechanical actuators and a single microprocessor, for example, would be required for forwarding the received instructions to the actuator(s).

In a development, it is also conceivable for the system to be designed such that at least one of the position parameters of the seat is changed in an autonomous and periodic manner. In so doing, the user can be assisted in always changing the sitting position in an ergonomically correct manner, which can for example be helpful in terms of preventing back problems. This functionality can also be coordinated in particular by the processor of the mobile terminal, only periodic instructions accordingly having to be transmitted from the mobile terminal to the actuators of the seat. This results in the aforementioned advantage whereby the electronics associated with the seat can be kept simple. Moreover, it is readily possible in this embodiment to ensure that the position parameters of the seat are only periodically changed when the seat and the mobile terminal are connected to one another at that moment. This can in particular mean that, when the user and his mobile terminal are at a distance from seat and therefore when the two components are not currently connected to one another, the position parameters are not periodically changed, which naturally saves energy.

Alternatively or additionally, at least one of the electromechanical actuators can be designed to transmit a tactile stimulus, for example a vibration or localised pressure, to a user sitting on the seat. This development of the system according to the invention can, to a certain degree, correspond to the vibration alert known from mobile phones or to call waiting used in smart watches, and can inform the user of a message input on the mobile terminal or of an upcoming appointment.

Alternatively or additionally, the system can also be designed such that the at least one sensor element is designed to detect at least one of the following: a force exerted by the user, a seating activity, the pulse of the user, the weight of the user and a temperature. It is conceivable for a sensor system designed in such a way to have a number of practical applications within the field of "Quantified Self". As explained above, a seat provides an optimum platform for monitoring the pulse and the weight of the user over a relatively long period of time, in particular making it possible to do without any additional wearables to be worn on the body since the user often sits on the seat for a relatively long period of time anyway. Furthermore, more complex applications are also conceivable, for example an integrated exercise function for the user that could work such that the user exerts a force on the backrest in response to a signal in order to strengthen their upper body strength, it being possible for the force applied by the user to then be measured and for any potential exercise progress to be followed over time.

All communication means for transmitting data wirelessly that are known to a person skilled in the art can be used in the system according to the invention, in particular at least one of the following: Bluetooth, W-LAN, infrared transmission or radio transmission. On this point, it should be noted in particular that a number of modern terminals, for example mobile phones and tablet computers, already contain the hardware required for generating a Bluetooth and W-LAN connection, and therefore it is possible to ensure reliable and resource-efficient data transmission without the need for any additional work.

In addition to the conventional inputting of control commands by means of buttons or softkeys in mobile terminals, it is also conceivable for the terminal to be provided with an input device that can be operated in a hands-free manner, for example a voice command or brain-computer interface device. The hardware required for this purpose may already be present in the mobile terminal, for example in the case of voice command, which is already standard in the field of mobile phones, or may consist of an additional component that is separate from and wirelessly connected to the mobile terminal, for example, the electrodes required for certain brain-computer interface devices. For reasons of clarity and readability, in the context of the present invention, if an additional component is provided, said component is considered to be part of the mobile terminal even if it is structurally and spatially separate from said terminal.

Using such a hands-free input device makes it possible for example for the user to adjust a position parameter of the seat without having to take hold of their mobile terminal, which, depending on the circumstances, would result in the user being distracted from an activity in which they are currently engaged.

As already mentioned on multiple occasions, the system according to the invention may comprise a mobile terminal, a mobile phone or a tablet computer, wherein, in this case, the inputs by the user and/or the processing of the data collected by the at least one sensor element is carried out by means of a software application designed for this purpose. By transferring the functionality to a dedicated software application, the actuation of the actuators and the receipt and processing of the data collected by the sensors can be abstracted, which makes it possible to achieve the functionality of the present system independently of the software platform used in the mobile terminal. It is therefore possible to transmit data wirelessly between a particular seat and mobile terminals in which different operation systems, for example iOS, Android or Windows Mobile, are used. In this case, a person skilled in the art has almost complete freedom in terms of the design of the software application, although it is advantageous to provide a graphical interface for inputting and/or displaying the processed data. Such graphical interfaces correspond to the aforementioned user's usage habits and makes it possible to intuitively operate the system according to the invention.

In order to supply power to the electric or electronic components of the seat, said seat may comprise an energy storage device and also be designed such that this energy storage device can be charged wirelessly. In this case, the energy storage device may for example be integrated in the seat surface, the armrests or structurally similar components of the seat such that said device cannot be seen from the outside and thus does not influence the shape of the seat. The energy storage device may be wirelessly charged in an inductive manner, for example, by the system according to the invention being combined with a corresponding floor mat, by which an alternating electromagnetic field is generated that can charge the energy storage device by means of a receiving antenna assigned to the seat. Naturally, however, it is also conceivable for the seat to be powered in a conventional manner using cables.

Alternatively or additionally, the seat may comprise actuators for driving chair castors provided on the seat. As a result, it is for example possible for the seat to autonomously assume predefined positions by means of the driveable chair castors. A possible application of this design would for example be that the seat autonomously travels, at regular intervals, into a charging station in order to charge an energy storage device, where it stays until the energy storage device has reached a predetermined charge level.

In order to add the functionality of the system according the invention without any difficulty to seats that are already in production or have already been purchased, all the functional elements, in particular the actuators, sensors, energy storage device and communication means of the seat, may be received in a chair column of the seat. As a result, it is only necessary to replace this chair column in order to integrate an existing seat in the system according to the invention.

The invention lastly relates to a method for controlling at least one electromechanical actuator assigned to a seat and/or for receiving, processing and displaying, by means of a mobile terminal, data collected by a sensor element that is assigned to the seat, in particular for use in a system having the aforementioned features, the mobile terminal running a computer program that provides a user with a graphical interface, by means of which said user can control the at least one actuator and/or which graphically displays the collected and processed data. In this case, the method comprises wirelessly transmitting data between the seat and the mobile terminal.

The method according to the invention can be developed such that there is not a fixed pairing between a mobile terminal and a particular seat, but rather the mobile terminal is connected, in each case, to the particular seat on which the user is currently sat. This further increases the flexibility of the method, in particular for users who change workstation several times during one day.

Similarly, it is possible for a particular seat to be connected to different mobile terminals depending on which user from a group of several users is currently using the seat. In this context, it is conceivable to store user-related data on the relevant mobile terminal, and to cause the seat to perform a predefined action, by means of the at least one actuator, on the basis of the stored data once the corresponding mobile terminal of the relevant user has been connected to the seat, which action for example consists in automatically adjusting the position parameters of the seat into a position preset by the user. In this case, the mobile terminal can either ask the user for confirmation, for example by means of a dialog window of a software application, before performing the predefined action, or perform this action solely in response to the mobile terminal being connected to the seat.

BRIEF DESCRIPTION OF THE DRAWINGS

The invention will be explained in greater detail in the following on the basis of a preferred embodiment and with reference to the attached drawings, in which:

FIG. 1 shows a seat in the form of a desk chair that is part of the system according to the invention, and FIG. 2 shows a mobile terminal which also belongs to the system according to the invention and on which a corresponding software application is currently being run.

DETAILED DESCRIPTION

In FIG. 1, reference numeral 10 denotes a seat in the known form of a desk chair that is part of the system according to the invention. In a known manner, the desk chair 10 comprises a backrest 12, a seat surface 14, a chair column 16 that is adjustable in length, a base 18, and conventionally five chair castors 20. However, in addition to the stated and conventional structural features, the chair 10 shown also comprises a plurality of actuators, sensors and additional electronic components.

These components include an actuator 22 for the tilt angle of the backrest that is designed to adjust the tilt angle of the backrest 12, an actuator 24 for the seat height that is designed to adjust the height of the seat surface 14 with respect to the base 18 by changing the length of the chair column 16, and a drive actuator 26 assigned to each of the chair castors 20 that is capable of driving the corresponding chair castor 20. In this case, the actuator 24 for the seat height in particular replaces the pneumatic springs for adjusting the chair height that are known from conventional desk chairs. Optionally, the actuator 24, or an additional actuator (not shown), can also be designed to rotate the seat surface 14 with respect to the base 18, in addition to adjusting the height of the seat surface 14. Using his general knowledge, a person skilled in the art can freely select the respective types of electromechanical actuators 22, 24 and 26 used in the desk chair 10 according to the invention, it being particularly conceivable to use DC or commutator motors.

A vibration actuator 28 is also provided in the backrest 12 and informs the user of an event, for example an incoming text message on the mobile terminal 50 from FIG. 2, by means of a vibration as is known in the case of mobile phones.

The desk chair 10 shown is also provided with a plurality of sensors. These comprise respective pressure sensors 32 and 32 that are accordingly assigned to the backrest 12 and the seat surface 14 and can detect a force exerted on the backrest 12 by the user or the weight of the user, on the basis of the pressure exerted on the seat surface 14. A position sensor 36 is also arranged in the base 18 of the desk chair 10, which position sensor can determine the current position of the desk chair 10 in the room by interacting with external components (not shown) arranged in the surroundings, for example a base station. An integrated sensor 38 designed to measure the pulse of the user and the surrounding temperature is also provided in the backrest 12.

For communication with the mobile terminal 50 shown in FIG. 2 of the system according to the invention, in order to collate the data collected by the individual sensors 32, 34, 36, 38 and in order to actuate all of the different actuators 22, 24, 26, 28, a control element 40 is also provided in the chair column 16. This can for example be formed as a microprocessor that actuates the respective actuators 22, 24, 26, 28 by means of interfaces and receives signals from the sensors 32, 34, 36, 38 arranged in the desk chair 10. Furthermore, the control element 40 is operationally connected to an antenna 44 that ensures the communicative coupling to the mobile terminal 50 from FIG. 2, as schematically represented by propagating waves K in FIG. 1. The control element 40 and all of the actuators 22, 24, 26, 28 are powered centrally by an energy storage device 42 in the form of a battery, which is arranged in the seat surface 14 such that said device cannot be seen from the outside and thus the desk chair 10 can retain its usual shape. For reasons of clarity, the electric cords leading from the energy storage device 42 to the individual actuators 22, 24, 26, 28 are not shown in FIG. 1.

FIG. 2 shows the mobile terminal belonging to the system according to the invention, which terminal is denoted in a general manner by reference numeral 50. Said device substantially comprises a touchscreen 52, the function of which is to display information, input instructions and generally operate the terminal 50, and an additional input element 54, which is in the form of a physical button in the mobile terminal shown. The mobile terminal 50 also comprises a communication means, which is generally designed as an antenna integrated in the housing of said device, as indicated in this case merely by waves K propagating from the mobile terminal 50. In particular, the equipment from FIG. 1 and FIG. 2 can be interconnected by means of a Bluetooth connection, and therefore a working range sufficient for this purpose is combined with a tap-proof encryption and resource-efficient design.

It can be seen on the touchscreen 52 that the mobile terminal 50 is currently running a software application that schematically represents the chair 10 shown in FIG. 1. This schematic display is denoted by reference numeral 100 in FIG. 2. Within the schematic display 100, there are pairs of buttons 102, 104, 106 and 108 that are each provided with an arrow and which, when pressed by a user, actuate respective actuators of the chair 10 from FIG. 1. More particularly, the user can control the tilt of the backrest 12 of the chair 10 by means of the command buttons 102, control the height of the seat surface 14 of the chair 10 by means of the command buttons 104, rotate the seat surface 14 with respect to the base 18 by means of the command buttons 106, and move the chair 10 forwards and backwards by means of the command buttons 108.

In addition to the schematic display 100 of the chair 10, a text field 110 is also provided in the lower region of the touchscreen 52, which text field displays general information relating to the status of the system formed by the chair 10 and the mobile terminal 50, and data received by means of the sensors 32 and 34. From top to bottom, the following is displayed in the example shown:

an indication as to whether or not the chair 10 and the mobile terminal 50 are currently connected to one another (in the example shown, this is indeed the case);

the charge level of the energy storage device 42 of the chair 10 (in this case 58%);

the weight of the user currently sitting on the chair (in this case 75 kg);

the current pulse of the user sitting on the chair (in this case 62 beats per minute);

the room temperature (in this case 22° C.); and an activity display, which in this case, for example, shows that the user has carried out 35% of a particular level of activity on the corresponding day, for example in relation to a number of times pressure is exerted on said backrest 12, as recorded by the sensor 32 located in said backrest 12.

The invention claimed is:

1. A system comprising a seat and a mobile terminal that are connected to one another in order to transmit data, wherein:
   the seat comprises at least one electromechanical actuator and at least one sensor element;
   the mobile terminal is configured to:
      receive control command inputs from a user for controlling the at least one electromechanical actuator,
      control the at least one electromechanical actuator on the basis of the inputs,
      receive and process data collected by the at least one sensor element, and
      display the data;
   the seat and the mobile terminal are each provided with communication means, which are configured to wirelessly transmit data between the seat and the mobile terminal,
   the seat is configured to autonomously travel to predefined travel positions by means of chair castors which are driven by the at least one electromechanical actuator,
   the at least one electromechanical actuator, the at least one sensor element, and the communication means of the seat are received in a chair column of the seat;
   the system is configured to periodically change at least one position parameter of the seat to change a sitting position of the user sitting on the seat, and
   the at least one electromechanical actuator is configured to transmit a tactile stimulus using a vibration or localised pressure, to a user sitting on the seat to provide a signal to the user.

2. The system according to claim 1, wherein the at least one electromechanical actuator controls at least one position parameter of the seat.

3. The system according to claim 1, wherein the at least one sensor element is configured to detect at least one of the following: a force exerted by the user, a seating activity, the pulse of the user, the weight of the user and a temperature.

4. The system according to claim 1, wherein the communication means are configured to wirelessly transmit data by means of at least one of the following: Bluetooth, W-LAN, infrared transmission or radio transmission.

5. The system according to claim 1, wherein the mobile terminal comprises an input device that can be operated in a hands-free manner using a voice command or brain-computer interface device.

6. The system according to claim 1, wherein the mobile terminal is a mobile phone or a tablet computer, and the inputs by the user or the processing of the data collected by the at least one sensor element is carried out by means of a software application configured for this purpose.

7. The system according to claim 6, wherein the software application has a graphical interface for inputting and displaying processed data.

8. The system according to claim 1, wherein the seat further includes an energy storage device for powering the at least one electromechanical actuator and configured to be charged wirelessly.

9. The system according to claim 1, wherein the at least one electromechanical actuator comprises castor actuators for driving the chair castors.

10. A method for controlling at least one electromechanical actuator assigned to a seat and for receiving, processing and displaying, by means of a mobile terminal, data collected by a sensor element that is assigned to the seat, the method comprising:
    assigning the at least one electromechanical actuator and the sensor element to the seat;
    establishing a connection for transmitting data between the mobile terminal and the seat;
    receiving, processing and displaying, by means of the mobile terminal, the data collected by the sensor element,
    operating the mobile terminal to provide a user with a graphical interface, by means of which the user can input control commands that control the at least one electromechanical actuator to move the seat, and which graphically represents the collected and processed data, and
    wirelessly transmitting data, including user-related data stored on the mobile terminal, between the seat and the mobile terminal,
    wherein once the connection between the mobile terminal and the seat has been established, the seat is caused to perform a predefined action, by means of the at least one electromechanical actuator, on the basis of the stored data, and the predefined action is autonomously traveling to predefined travel positions for the seat by means of chair castors which are driven by the at least one electromechanical actuator,
    wherein the at least one electromechanical actuator, and the sensor element are received in a chair column of the seat,
    wherein the system is configured to periodically change at least one position parameter of the seat to change a sitting position of the user sitting on the seat, and
    wherein the at least one electromechanical actuator is configured to transmit a tactile stimulus using a vibration or localised pressure, to a user sitting on the seat to provide a signal to the user.

11. A system comprising a seat and a mobile terminal that are connected to one another in order to transmit data, wherein:
    the seat comprises at least one electromechanical actuator and at least one sensor element;
    the mobile terminal is configured to receive inputs from a user, control the at least one electromechanical actuator based on the inputs to move the seat, receive and process data relating to a status of the system and collected by the at least one sensor element, and display the data;
    the seat and the mobile terminal are each provided with communication elements that wirelessly transmit data between the seat and the mobile terminal,
    the seat is configured to autonomously travel to a predefined position via chair castors that are connected to the seat and that are driven by the least one electromechanical actuator,
    the at least one electromechanical actuator, the at least one sensor element and the communication element of the seat are received in a chair column of the seat;
    the system is configured to periodically change at least one position parameter of the seat to change a sitting position of the user sitting on the seat, and the at least one electromechanical actuator is configured to transmit a tactile stimulus using a vibration or localised pressure, to a user sitting on the seat to provide a signal to the user.

* * * * *